United States Patent Office 2,743,656
Patented May 1, 1956

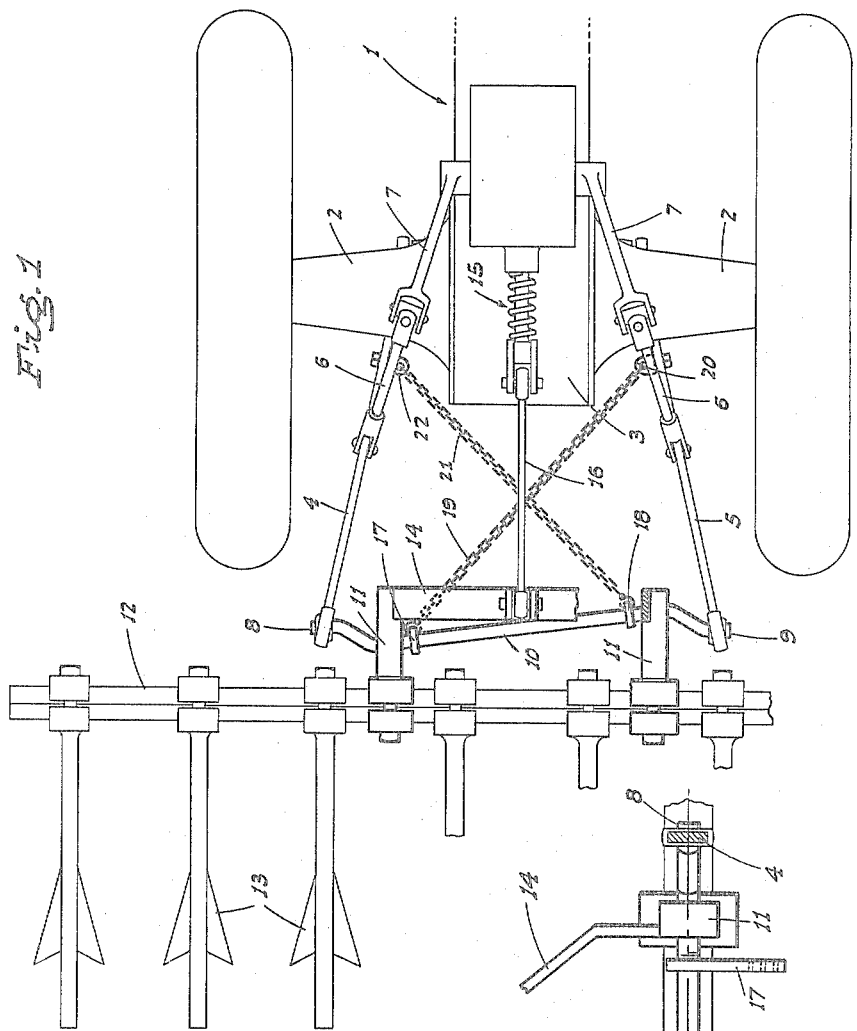

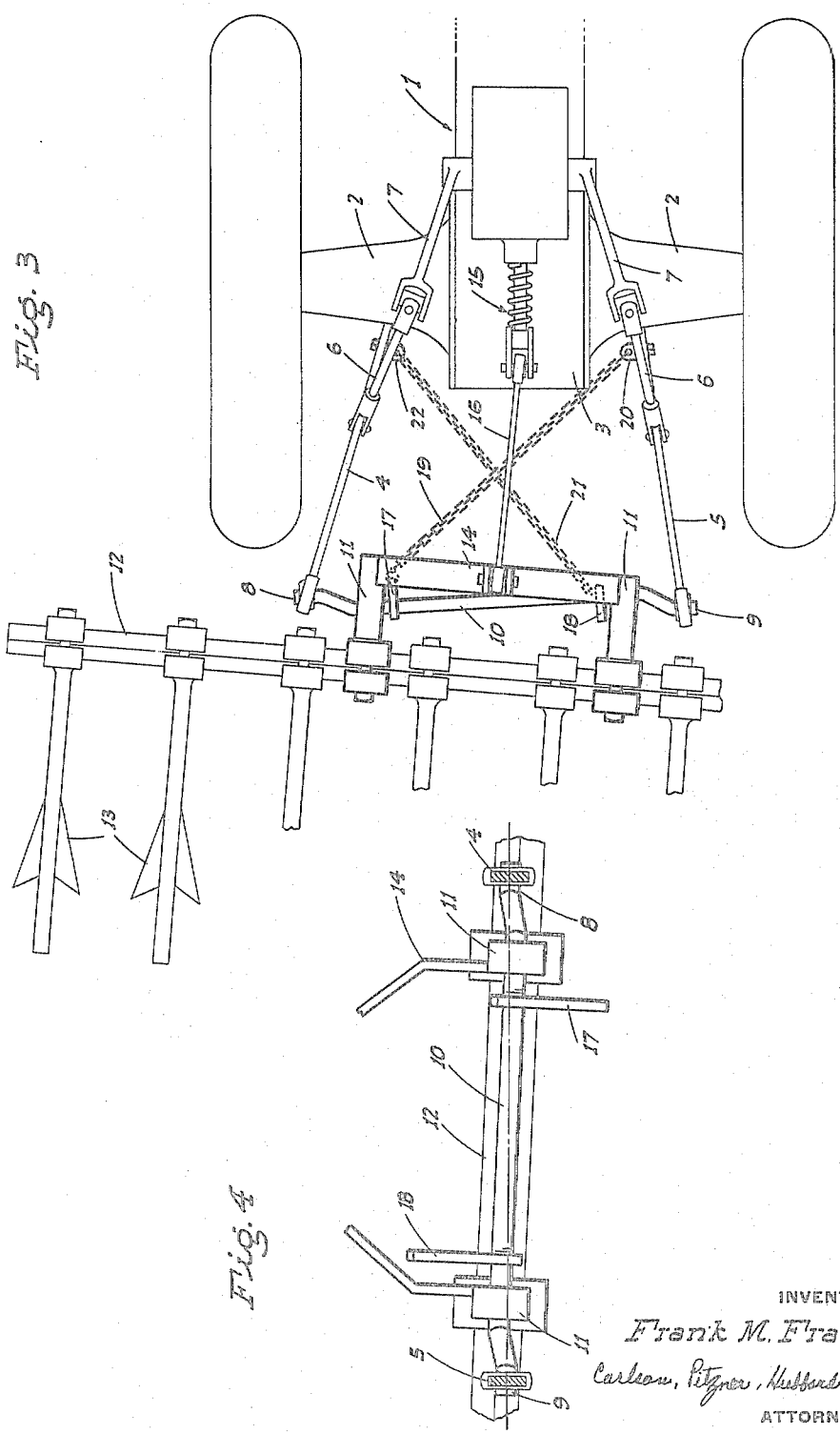

2,743,656

CRANK UNIT FOR AUTOMATIC ADJUSTMENT OF IMPLEMENTS

Frank M. Fraga, Fresno, Calif.

Continuation of application Serial No. 145,174, February 20, 1950. This application November 3, 1952, Serial No. 318,499

2 Claims. (Cl. 97—47.65)

This invention relates to an implement draft or hitch device particularly designed for use with a tractor having a combined draft and automatic lift mechanism for the tool bar on which the implements are mounted, and which mechanism includes draft links supported at a fixed level while the implement is in normal operation and mounted for lateral swinging movement relative to the tractor about a theoretical axis thereon.

The present invention is particularly designed for use with an implement frame or tool bar having a number of depending implements of a type which will normally equalize any side draft tendencies and maintain a straight central position relative to the tractor. At times, due to various ground contours or conditions, the implements may dig in deeper on one side than the other or otherwise cause the tool bar to shift laterally relative to the tractor to one side or the other of its normal central position, which shifting is always away from the side of greatest resistance. This places a side drag on the tractor, which tends to turn toward the side of greatest resistance, making it hard to steer the tractor. An object of this invention, therefore, is to counteract this lateral shifting and uneven tool depth by the provision of a hitch device between the tool bar and draft links so arranged that when any relative lateral shift of the tool bar to one side occurs, the opposite portion of the tool bar and its depending tools are immediately and automatically lifted while the portion of the bar on said one side is lowered. This relieves the drag of the tools on the raised side and sets up a temporary lateral counter drag in the opposite direction, causing the tool bar to return to its normal centralized position, and to be restored to a proper transverse level.

This improved hitch also utilizes the lateral motion of the implement when making a turn with the implements in the ground, the lateral motion causing the implement automatically to change its orientation relative to the tractor, thus assisting in making short turns. It is a more specific object of the invention to provide a draft hitch for an implement connected to the trailing ends of a pair of draft links in which the implement is skewed with respect to the ends of the links automatically in accordance with the lateral swing of the implement so as to enable short turns to be made.

A further object of the invention is to produce a practical device and one which will be exceedingly effective for the purpose for which it is designed.

These objects are accomplished by means of such structure and relative arrangement of parts as will fully appear by a perusal of the following specification and claims.

Other objects and advantages will be apparent upon reading the attached detailed description and upon reference to the drawings, in which:

Figure 1 is a plan outline of a tractor and implement unit, showing my improved hitch device in its normal working position.

Fig. 2 is a fragmentary enlarged transverse elevation of the device in a position corresponding to Fig. 1, and looking toward the rear.

Fig. 3 is a plan outline of the tractor and implement unit showing the device in the position assumed upon a relative shift of the tool bar to the left of the tractor.

Fig. 4 is a view similar to Fig. 2 but showing the device in the position corresponding to Fig. 3.

Referring now more particularly to the characters of reference on the drawings, the tractor 1 to which the implement unit is connected includes rear axle housings 2 projecting laterally from the main mechanism housing 3 and from under which the draft links 4 and 5 project rearwardly. These links are laterally swingable, being swivelly connected at their forward ends on the tractor. Drop links 6 are connected to the draft links intermediate their ends and extend upwardly to connection with lift arms 7 journaled in the housing 3. Lift mechanism for supporting the arms 7 is set forth in detail in Ferguson Patent 2,118,180.

The links 4 and 5 are arranged convergently, and as explained in Ferguson Patent 1,916,945, normally tend to cause lateral swinging of the implement about a region generally aligned with the front wheels of the tractor. The draft links are connected at their rear ends to cranks 8 and 9, the cranks terminating in draft pins to provide a pivoting connection. The cranks in the present embodiment normally project forwardly and rearwardly, respectively, from a transverse normally horizontal shaft 10. This shaft is journaled adjacent the cranks in brackets 11 rigid with and projecting forwardly from a transversely extending normally horizontal implement frame member such as a tool bar 12 from which a number of tools 13 of suitable type depend. Since the draft links 4 and 5, which are part of the standard tractor equipment, are ordinarily the same length, the shaft 10 in the present embodiment is normally diagonaled somewhat relative to a right-angle transverse plane, and to the tool bar which preferably lies in such plane.

An A-frame 14 rigidly upstands from the brackets 11 and is connected to the conventional automatic control member 15 on the tractor by a compression link 16.

In carrying out the present invention a force-transmitting member is provided which has a torque-transmitting connection at its rear end for rotatively positioning the cranks 8 and 9 and which is anchored with respect to the tractor at a horizontally offset point at its forward end so that the cranks are rotated in accordance with the lateral swing of the implement relative to the tractor. In the present instance this is accomplished by a crank and chain arrangement. Since a chain can transmit force in tension only, two chains are preferably used to provide movement of the cranks in both directions of rotation. The chains are indicated at 19, 21 and torque is applied to the shaft 10 by rocker arms 17, 18 respectively. The latter extend from the shaft 10 in opposite directions as indicated. The rocker arm 17 depends from the shaft 10 near crank 8 while the arm 18 upstands from said shaft near crank 9.

The chain 19 extends forwardly from a connection with arm 17 at a selected point in the length of the latter, being connected at its forward end to any eye 20 preferably mounted on link 5 near its forward end. The chain 21 extends from a connection with arm 18 to an eye 22 on link 4 near its forward end, the chains thus crossing each other.

Whether or not the chains are attached to the links as shown and above described is immaterial, however, as long as the condition is met that the possible lateral shifting, if any, of the chains at their forward end is less than the lateral movement of rocker arms 17 and 18, to which the chains at their rear end are connected. In other words, it is sufficient that a chain or equivalent force-transmitting means be attached at its forward end at a point which is horizontally offset with respect to the rear end so that torque is transmitted to the shaft 10 when the links swing laterally.

The arms 17 and 18 have several holes in their length for the attachment of the chains thereto so that the degree of turning of shaft 10 for a given amount of lateral swing may be altered. Also, the chains are arranged for adjustment of their slack in any suitable manner, as by shifting eyes 20 and 22 along the draft links 5 and 4, or by turnbuckles interposed in the chains.

In operation, under normal conditions the tool bar is level, and the implement unit pulls ahead without any appreciable tendency to shift laterally.

If, in the present embodiment certain factors act on the tool bar to increase the depth of penetration of the tools on the right side of the tractor, for instance, or the drag of such tools becomes otherwise unduly increased because of ground resistance, such action results in a relative shift of the tool bar to the left as shown in Fig. 3, making it hard to steer the tractor; the latter tending to turn to the right.

With this shift of bar 12, the links 4 and 5 also swing to the left about their front end mountings as pivots. This movement places chain 19 under tension and causes the depending arm 17 to which said chain is connected to be pulled forward to rotate shaft 10, since the lateral shift at arm 17 is greater than that at eye 20, as will be evident. The opposite chain 21, however, becomes slack, since the conditions as to this chain are reversed.

Since links 4 and 5, to which cranks 8 and 9 are connected, are supported at the same level by the drop links 6, the ends of the cranks cannot be lowered or raised relative to one another. Thus, the shaft itself becomes laterally tilted, being lowered at its left side and raised at its right side, as shown in Fig. 4. This results in skewing of the tool bar and tools relative to the trailing ends of the draft links. By skewing is meant that the implement frame moves angularly to change its orientation with respect to the trailing ends of the draft links.

As shown in Figs. 3 and 4, this skewing takes place both horizontally and vertically. With regard to skewing in a vertical plane, rotation of shaft 10 tends to move the tool bar and tools downwardly on the left-hand side, upwardly on the right. This increases the depth of penetration of the tool on the left thereby increasing the ground resistance on this side. The converse occurs on the right-hand side. Such skewing tends to remove the original unbalance of forces which caused the implement to move to the left and the implement is therefore free to assume its central position of equilibrium.

With regard to skewing in the horizontal plane, it will be understood in referring to Figs. 3 and 4 that the left-hand side of the tool bar does not only move up and down upon turning of the crank shaft. On the contrary, any movement of the cranks must be eccentric, i. e., must follow an arc. Thus there is a component of movement of the left-hand side of the tool bar forwardly toward the trailing end of the draft link 4. Similar eccentric movement occurs at the other or right-hand end of the tool bar, except that the horizontal component of such movement is in a direction away from the trailing end of the draft link 5. The net effect is to cause horizontal skewing of the tool bar to the right or clockwise as viewed in Fig. 3. This skewing is over and above the angling normally caused by the lateral swing of the links. Thus the implement tends to steer back to its central position relative to the tractor.

In the above discussion it has been assumed that the initial leftward swing of the implement relative to the tractor was caused by unbalance of force on the tools of the implement. It will be apparent to one skilled in this art that the same relative swing occurs when making short turns, for example, turns to the left at the end of the furrow. This is pictured in Figs. 3 and 4. The horizontal skewing of the impelment relative to the trailing ends of the draft links has the effect of producing greater articulation than is permitted by the draft links operating alone, thereby enabling a shorter turn to be made. The center of swing of the implement about the tractor is, in effect, moved from the region of the front wheels backwardly toward the rear wheels.

During return movement of the implement, the chain 19 becomes slack, while chain 21 is temporarily placed under tension, causing it to pull forward on upstanding arm 18 (which was previously turned to the rear with the forward turning of arm 17) and restoring said arm and the crank shaft to a normal horizontal position.

It will be found that the leveling hitch above described greatly improves operations, both as to ease of manipulation and quality of work performed, especially when a wide implement unit is employed in a vineyard or orchard which has been furrowed for irrigation, in land which had been planted to row crops and in which the furrows are not straight or are of a different spacing from the tractor wheels, or under any like condition which may cause a tractor wheel to drop and thus lower the implement on that side with it. My automatically functioning device immediately restores the implement to a normal level, whereas with the ordinary hitch, the operator must level the implement manually.

This device also greatly improves the handling of the tractor when it is desired to drive in a zig-zag path, or to make a turn with the tools in the ground, as the side of the implement in the direction of turn will be caused to dig deeper and thus aid in the turning action. This vertical skewing effect is in addition to the steering effect achieved by the horizontal skewing set forth in Fig. 3.

It will be apparent that the hitch may be advantageously used with a "unicarrier" having narrow wheel spacing and a wide implement mounting bar.

From the foregoing description it will be readily seen that there has been produced such a device as substantially fulfills the objects of the invention as set forth herein.

While this specification sets forth in detail the present and preferred construction of the device, still in practice such deviations from said detail may be resorted to as do not form a departure from the spirit of the invention, as defined by the appended claims.

This application is a continuation of my application Serial No. 145,174, filed February 20, 1950, now abandoned.

I claim as my invention:

1. A leveling draft hitch for attaching implements to a tractor equipped with a pair of transversely spaced draft links trailingly pivoted thereon for lateral swinging movement relative thereto, said hitch comprising, in combination, a transversely extending implement frame member, crank shaft supporting means rigid with the frame member, a crank shaft having opposed end cranks turnably supported in the frame member and normally set in substantially horizontal alinement in a transverse vertical plane, said cranks having pivoting engagement with the trailing ends of the tractor draft links, and means between the crank shaft and the draft links to rotate the crank shaft in a direction to lower the frame member on one side upon an accompanying lateral shift of the member to said side.

2. A structure as in claim 1, in which said means comprises an upstanding arm fixed on the crank shaft adjacent one crank, said crank and arm being normally disposed relative to each other so that forward turning of the arm will raise the shaft on the side toward which the frame member is shifted, and a flexible element connected to the last named arm and to the opposite draft arm at a point thereon relatively close to its point of mounting on the vehicle.

(References on following page)

References Cited in the file of this patent

UNITED STATES PATENTS

| | | |
|---|---|---|
| 1,916,945 | Ferguson | July 4, 1933 |
| 2,141,819 | Nelson | Dec. 27, 1938 |
| 2,347,898 | Ferguson | May 2, 1944 |
| 2,379,225 | Fraga | June 26, 1945 |
| 2,530,656 | Briscoe | Nov. 21, 1950 |
| 2,601,640 | Simmons | June 24, 1952 |
| 2,653,531 | Collins | Sept. 29, 1953 |

FOREIGN PATENTS

| | | |
|---|---|---|
| 549,780 | Great Britain | Dec. 7, 1942 |
| 556,793 | Great Britain | Oct. 21, 1943 |